(12) United States Patent
Sahouani et al.

(10) Patent No.: US 6,488,866 B1
(45) Date of Patent: Dec. 3, 2002

(54) LIQUID CRYSTAL MATERIALS AND ALIGNMENT STRUCTURES AND OPTICAL DEVICES CONTAINING SAME

(75) Inventors: Hassan Sahouani, Hastings, MN (US); Kim M. Vogel, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 103 days.

(21) Appl. No.: 09/708,758

(22) Filed: Nov. 8, 2000

(51) Int. Cl.$^7$ .................. C09K 19/52; C09K 19/54; C07D 403/04; C07D 251/54
(52) U.S. Cl. .................. 252/299.01; 252/299.1; 252/299.5; 428/1.1; 428/1.2; 544/198
(58) Field of Search .................. 252/299.61, 299.1, 252/299.01, 299.5; 428/1.1, 1.2; 544/198, 212

(56) References Cited

U.S. PATENT DOCUMENTS

| | | | |
|---|---|---|---|
| 5,639,398 A | | 6/1997 | Rhee et al. ............ 252/299.01 |
| 5,948,478 A | | 9/1999 | Sahouani et al. ............ 428/1.3 |
| 6,051,290 A | * | 4/2000 | Sahouani et al. ............ 428/1.1 |
| 6,245,399 B1 | * | 6/2001 | Sahouani et al. ............ 428/1.3 |
| 6,395,354 B1 | * | 5/2002 | Sahouani et al. ............ 428/1.2 |

FOREIGN PATENT DOCUMENTS

| | | |
|---|---|---|
| WO | WO00/22463 | 4/2000 |
| WO | WO01/31370 | 5/2001 |
| WO | WO01/35161 | 5/2001 |

OTHER PUBLICATIONS

Attwood, T.K., and Lydon, J.E., 1984, *Molec. Crystals liq. Crystals*, 108, 349.

* cited by examiner

*Primary Examiner*—Shean C. Wu
(74) *Attorney, Agent, or Firm*—Bruce E. Black

(57) ABSTRACT

An alignment structure useful in a liquid crystal display device comprising a substrate having disposed thereon an oriented film of a lyotropic nematic liquid crystalline material. Particularly useful lyotropic materials include a class of nematic liquid crystalline compounds known as chromonics. The substrates can be made by coating the lyotropic liquid crystal material onto the substrate to provide an oriented film of the lyotropic material. The alignment structure can also include one or more polarizing dyes or other additives and can thus be made to perform polarizing, retarding and/or color filtering functions in addition to alignment and orientation functions. Liquid crystal displays containing such alignment structures and methods of making such displays are also described.

11 Claims, 2 Drawing Sheets

LIQUID CRYSTAL MATERIALS AND ALIGNMENT STRUCTURES AND OPTICAL DEVICES CONTAINING SAME

FIELD OF THE INVENTION

In one aspect, the present invention relates to structures, including alignment films and alignment substrates useful in liquid crystal displays. In another aspect, the invention relates to display devices and other optical devices that utilize liquid crystal alignment films or substrates therein.

BACKGROUND OF THE INVENTION

A common liquid crystal display, or "LCD," contains an array of two-dimensional picture elements, or pixels. Although each pixel may, and customarily does, contain numerous optical elements, each comprises a liquid crystal cell. A liquid crystal cell generally comprises a liquid crystal material maintained between a pair of transparent substrates, and those substrates most commonly are made of glass or a polymeric material such as polyimide. Interposed between the liquid crystal material and the substrates are electrodes electrically connected to an outside signal device that, when electrically active, alter the state of the liquid crystal material. Such liquid crystal cells find application not only in displays, but also in other optical devices, including optical communication devices and other optical processing equipment.

In a liquid crystal cell, the molecules of liquid crystal material are aligned, or oriented, in a preferred direction along each of the substrates within the cell. Normally, this alignment is accomplished through the use of an alignment structure layer. Alignment layers generally are glass substrates or polymeric films, typically polyimides, that are mechanically rubbed in a single direction to impart an orientating effect on the liquid crystals with which they contact. The optical activity of the liquid crystal cell is in part a function of the relative orientation of the liquid crystals at the surface of each of the substrates and the ordered change in direction of the crystals between the substrates.

Such conventional alignment layers suffer myriad drawbacks. For example, the high temperatures necessary to process of many useful polymeric substrates prevent the incorporation of temperature-sensitive additives such as color dyes into the alignment structures. Also, the conventional rubbing, washing and drying steps used in manufacture of the layer films and substrates can be slow, expensive and introduce gross defects and low yields.

SUMMARY OF THE INVENTION

Briefly, in one aspect, the present invention provides an alignment structure useful in a liquid crystal display device that comprises a substrate having disposed thereon an oriented film or layer of a lyotropic liquid crystalline material. Particularly useful lyotropic liquid crystalline materials include a class of compounds known as chromonics. The structures of the invention can be made by coating the liquid crystalline material onto a substrate to provide an oriented film of the lyotropic material. The alignment substrates can also include one or more dyes or other additives and can thus, in addition to alignment and orientation, be made to perform polarizing, retarding and/or color filtering functions. The alignment structures can also be made with one or more additional layers, such as, for example, cholesteric retarders, non-optical polymers, etc.

In another aspect the invention provides optical devices. The optical devices include at least one liquid crystal material disposed between two substrates, wherein at least one of the substrates have disposed thereon an oriented film of a lyotropic liquid crystalline material. In other aspects, the invention provides methods of making such alignment structures and optical devices.

DETAILED DESCRIPTION OF PREFERRED EMBODIMENTS

Figure 1:
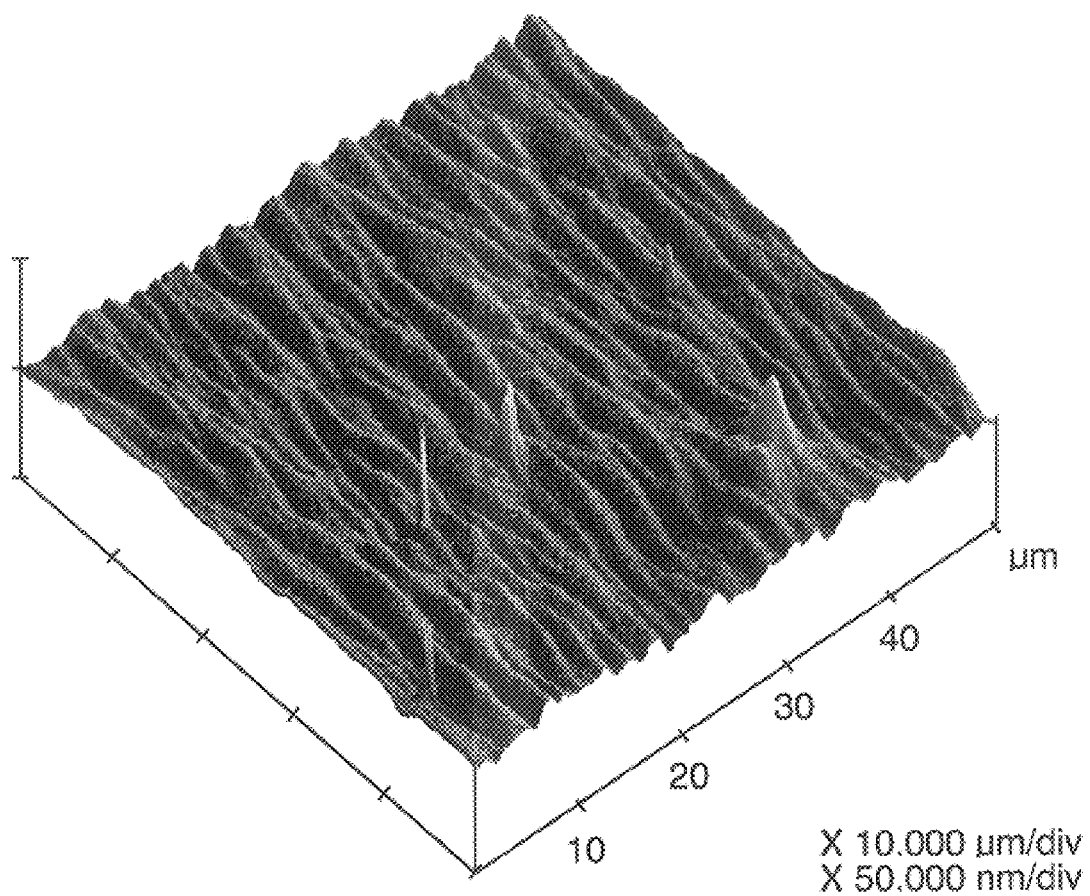
FIG. 1 is a scanning electron microscopic (SEM) image of the ordered surface of an alignment structure according to the invention.

In their most essential respect, the liquid crystal alignment (or, synonymously orientation) structures of the invention comprise a substrate onto which there is coated a layer of lyotropic liquid crystal material having an ordered molecular structure. The lyotropic liquid crystal materials may be easily ordered, for example, by the application of shear force to the materials, such as occurs during coating of the materials out of aqueous solution. For sufficient applied shear, the liquid crystalline material can assume an ordered orientation that, upon drying, provides an orientation or alignment substrate useful to orient bulk liquid crystal material in a liquid crystal cell or useful to align or order a non-liquid crystal coating. Because the levels of shear stress created during orientation of the lyotropic liquid crystal material are low compared to the shear stresses that might cause mechanical deformation of the substrates onto which the material is applied, the process of forming the alignment structures of the invention has a reduced tendency to create stresses that might distort the optical properties of the substrate. For certain applications, the alignment or orientation configurations of the invention allow for the use of more flexible substrates without regard to the degrading of optical properties.

Any lyotropic liquid crystal material that forms an ordered structure when applied to a suitable substrate can be employed in the invention. Useful lyotropic materials thus include those that form a variety of ordered structures upon application, including crystalline structures, lyotropic films, and other molecular orderings. Typically, the most useful lyotropic liquid crystal materials will be those nematic liquid crystal materials that contain at least one triazine group, including those of the type disclosed in U.S. Pat. No. 5,948,487, the disclosure of which is incorporated herein by reference. Preferably, the lyotropic liquid crystal materials are colorless. One class of particularly useful lyotropic materials are those known as "chromonics." See, e.g., Attwood, T. K., and Lydon, J. E., 1984, *Molec. Crystals liq. Crystals*, 108, 349. Chromonics are large, multi-ring molecules typically characterized by the presence of a hydrophobic core surrounded by various hydrophilic groups. The hydrophobic core can contain aromatic and/or non-aromatic rings. When in solution (typically above about 5 percent by weight of solution), these chromonic molecules tend to aggregate into a nematic ordering characterized by a long range order. Representative of chromonic compounds are the following:

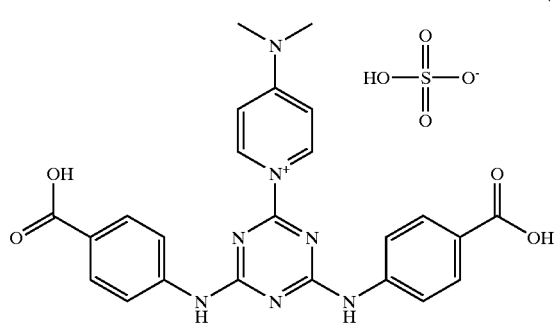

(4-Dimethylamino-1-[4,6-di(4-carboxyphenylamino)-1,3,5-triazin-2-yl] pyridium sulfate) and

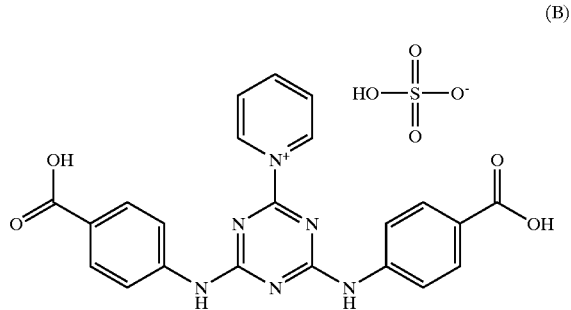

(4,6-di(4-carboxyphenylamino)-1,3,5-triazin-2-yl] pyridium sulfate)

Useful chromonic materials are also available in zwitterionic form, among them those of the formulae:

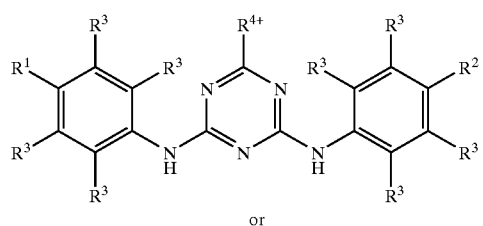

or

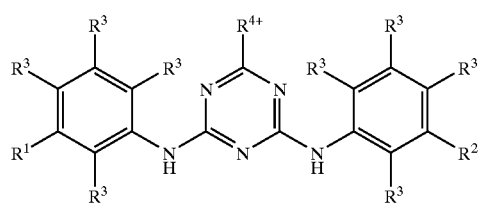

In reference to both formulae C and D above, $R^1$ is a hydrophilic group, including those generally selected from, but not limited to, carboxylate ($COO^-$), sulfonate ($SO_3^-$), sulfinate ($SO_2^-$), and phosphate ($PO_3H^-$) groups. Preferably, $R^1$ is a carboxylate or sulfonate group, most preferably a carboxylate group. The most preferred location for $R^1$ is para with respect to the amino linkage to the triazine backbone of the compound (shown by Formula C).

$R^2$ is a hydrophilic group generally selected from but not limited to carboxylic acid (COOH), sulfonic acid ($SO_3H$), sulfinic acid ($SO_2H$), phosphoric acid ($PO_3H$), or sulfonamide ($SO_2NH_2$) groups. Preferably, $R^2$ is a carboxylic acid group or a sulfonic acid group, most preferably a carboxylic acid group. The most preferred location for $R^2$ is para with respect to the amino linkage to the triazine backbone of the compound (shown by Formula C).

$R^3$, each of which may be the same or different, is selected from any electron donating group, electron withdrawing group or electron neutral group. Preferably, $R^3$ is hydrogen or a substituted or unsubstituted alkyl group, most preferably hydrogen.

$R^4$ is generally selected from substituted and unsubstituted positively charged heteroaromatic rings linked to the triazine backbone through a nitrogen atom within the ring of the $R^4$ group. $R^4$ can be, but is not limited to, heteroaromatic rings derived from pyridine, pyridazine, pyrimidine, pyrazine, imidazole, oxazole, thiazole, oxadiazole, thiadiazole, pyrazole, triazole, triazine, quinoline, and isoquinoline. Preferably, $R^4$ is a pyridine ring. When present, a substituent for the heteroaromatic ring $R^4$ may be selected to determine the properties of the chromonic material, for example, a desired color for the aligned lyotropic liquid crystal material. Such substituents for $R^4$ may be selected from, but are not limited to, any of the following substituted and unsubstituted groups: alkyl, carboxyl, amino, alkoxy, thio, cyano, amide and ester. Preferably, when present, the $R^4$ substituent is a substituted amino or pyrrolidino group, more preferably an alkyl substituted amino group, most preferably a dimethylamio group. Most preferably, the substituent is located at the 4 position on a pyridine ring.

In some cases, the performance of the lyotropic liquid crystal materials can be enhanced with the incorporation of one or more additive compounds. One useful additive is dimethylamino pyridine ("DMAP"), which when added to the lyotropic liquid crystal material in amounts between about 1 and 5 percent by weight (more preferably between about 1 and 2 weight percent) improves the optical clarity of the liquid crystal material. Other useful additives include simple sugars, e.g., sucrose, glucose and fructose, which can be added in similar concentrations. Depending on the methods employed to make devices incorporating the alignment structures of the invention, relatively temperature-stable additive materials (e.g., DMAP) may be preferred.

Layers of these and other chromonic molecules dried from shear coated solutions show a self-organized surface structure that easily and uniformly orient liquid crystals or non-liquid crystal coatings in a planar configuration. FIG. 1, for example, shows a scanning electron microscopic image of the surface of a polymeric substrate (polyethylene terephthalate) shear coated with a layer of Compound A above.

Coating of the liquid crystalline materials can be preformed by any convenient means that provides for the ordered arrangement of the liquid crystals along the plane of the substrate onto which they are applied. Typically, coating methods that impart shear stress to the coating material during the coating process will be preferred since shear stress imparted during coating can serve to form large and uniform domains of the ordered lyotropic liquid crystal molecules. Coating techniques that impart such shear stresses include wire-wound rod coating and conventional extrusion dye coating.

Drying of the coated liquid crystalline layer can be performed using any means suitable for drying aqueous coatings. Useful drying methods will not damage the coating or significantly disrupt any molecular ordering of the coated layer imparted by shear stress or other ordering effects applied during coating or application.

Substrates onto which the lyotropic materials can be applied include any solid material that will accept the coating of the liquid crystal material and that possesses whatever optical characteristics may be desired for its intended application. For example, transparency, translucency or reflectivity may be indicated for a given application. Suitable substrate materials include, for example, glass, rigid polymeric materials, flexible polymeric films, multilayer films and optical stacks. In addition to the layer of liquid crystal material, the substrates can also include any other layers customarily found in display devices or other components useful in displays. Such additional layers include, for example, polarizers, retarders, color filters, black matrices and electronically-addressable active or passive devices (e.g., transparent electrodes, organic and inorganic light emitting devices and thin film transistors) and the like. Thus, useful substrates can include one or more optically active layers (such as polarizers, color filters, etc.) and/or one or more additional layers or materials that can be used to affect or control the transmission, reflection, or absorption of light through an overall display construction. Suitable substrate materials can be colored or clear and can be birefringement or non-birefringement.

In representative embodiments, the alignment lyotropic liquid crystal materials can be coated or otherwise ordered onto substrates that have patterned electrodes (e.g., transparent conductive oxide stripes such as indium tin oxide ("ITO")) and/or that have a matrix of thin film transistors ("TFTs") or other electrically active devices. Such embodiments would include coating or ordering of the lyotropic materials directly on top of such electrodes or TFTs, on top of one or more immediate layers such as one or more planarization layer, or on a surface of the substrate opposing the surface having the electrodes or TFTs. Alternatively, the lyotropic materials can be coated onto substrates that are later equipped with electrodes and/or active devices.

Coating solutions of the lyotropic materials can be made by preparing a simple aqueous solution of water and a pH-adjusting compound such as $NH_4OH$. The coating solution can then be prepared by dissolving the lyotropic material in aqueous solution along with other additives such as surfactants and one or more polarizing and/or filtering dyes. Suitable water-soluble polymeric binders can also be added in small amounts to the solutions in amounts ranging from less than about 1 percent by weight to 5 percent or more. Polymers found useful for this purpose include dextran-type polymers and their sulfates and sulfonated polystyrenes. Generally, the liquid crystal materials can be added in amounts sufficient to form a solution of the lyotropic material with a concentration in the range from about 8 to about 20 percent by weight of solution, though concentrations in the range from about 10 to about 16 percent are more often preferred. Solutions of the lyotropic material outside this concentration range can also be used provided a desired level of functionality is preserved. For example, a solution of the lyotropic material should provide sufficient levels of ordered material on the final substrate and should therefore be sufficiently concentrated to provide adequate coating thickness and dryability, but not so concentrated as to be prohibitively difficult to coat and/or orient.

In some cases, it may be particularly desirable to incorporate one or more color dyes directly into the alignment structure to provide polarizing and/or color filtration functions. Such incorporation can eliminate the need for additional, separate polarizers or color filter layers in an overall display construction. For example, one or more pleochroic dyes can be incorporated into the ordered matrix of the lyotropic material to provide an ordered color polarizer. The incorporated dyes can be selected to provide a variety of useful filtration and polarizing optical effects in a display construction. Many such constructions are provided in co-pending U.S. patent application Ser. No. 09/426,288, the disclosure of which is hereby wholly incorporated by reference.

Figure 2:
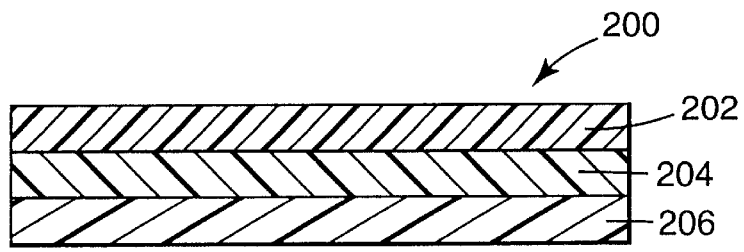
FIG. 2 is a schematic view of a liquid crystal cell according to one aspect of the invention.

The accompanying drawings illustrate various embodiments of the alignment structures of the invention. FIG. 2, for example, shows the construction of a simple liquid crystal cell 200 according to one embodiment of the invention. The liquid crystal cell 200 includes a top substrate 202 and a bottom substrate 206. On at least one surface of each substrate is an ordered layer of lyotropic liquid crystal material. Between the top and bottom alignment layers is a layer of aligned liquid crystal material 204. The aligned liquid crystal material could include any conventional nematic or smectic liquid crystal material, including twisted nematic liquid crystals, super twisted nematic liquid crystals, ferroelectric liquid crystals, anti-ferroelectric liquid crystals, cholesteric materials, etc. The aligned liquid crystal material can also constitute or include any of the chromonic materials or other lyotropic liquid crystal materials described above.

The top and bottom substrates are positioned such that the surface containing the ordered layer of lyotropic material of each of the substrates is in contact with the liquid crystal material 204 and are positioned to orient the liquid crystal material 204 in a desired manner. Either or both of the top and bottom substrates 202 and 206 can optionally include additional optically active layers. For example, in one embodiment, one or more pleochroic dyes are incorporated into lyotropic liquid crystal material of the alignment layer in such a manner that, upon application to the alignment substrate, the pleochroic dye is oriented with the lyotropic liquid crystal and the resulting alignment substrate may also be used as a dichroic polarizer.

Figure 3:
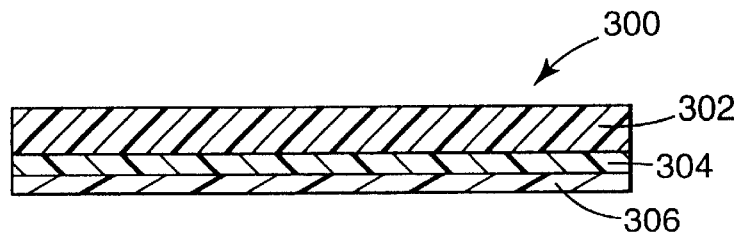
FIG. 3 is a schematic view of an alignment structure that incorporates an ordered layer of lyotropic liquid crystal material according to the invention.

FIG. 3 shows one possible construction of an alignment structure according to the invention. On substrate 300 there is coated a transparent electrode layer 304 such as indium tin oxide. Adjacent to the electrode layer 304 is an ordered layer of lyotropic liquid crystal material 306. In one embodiment the lyotropic material includes one or more pleochroic dyes and can thus function simultaneously, depending on the selection and orientation of the dye, as a polarizer, a color filter and an alignment layer.

Figure 4:
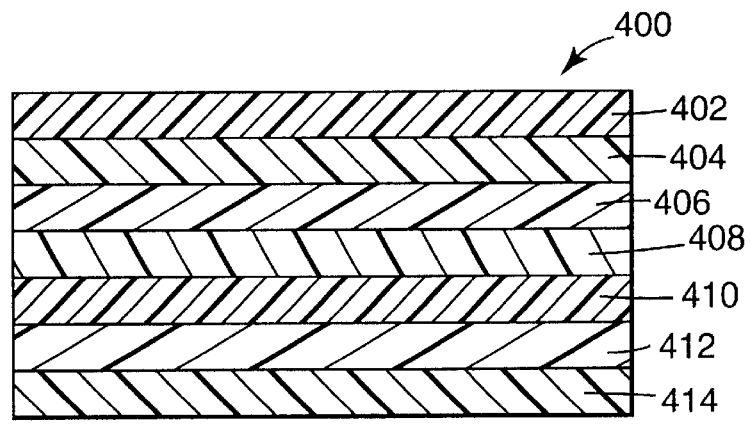
FIG. 4 is a schematic cross-sectional view of a two-polarizer liquid crystal display according to one aspect of the invention.

FIG. 4 provides a cross-sectional view of a possible two-polarizer liquid crystal display device, or LCD. The LCD 400 includes a top polarizer 402, an optional retarder or compensator 404, a liquid crystal cell that includes a top substrate 406, a bottom substrate 410 and a liquid crystal material 408 disposed therebetween. Below the liquid crystal cell is a bottom polarizer 412 and an optional reflective layer or transflector 414. At least one of the top and bottom substrates contains an ordered layer of lyotropic liquid crystal material disposed along the surface that is in contact with the liquid crystal material 408. The reflective or transflector layer 414 can be provided to allow lighting of the liquid crystal display 400 using ambient light or light from a front light guide (not shown). Optionally, a back light (also not shown) can be placed behind the display to allow for back lighting with or without the optional reflective or transflective layer 414.

Figure 5:
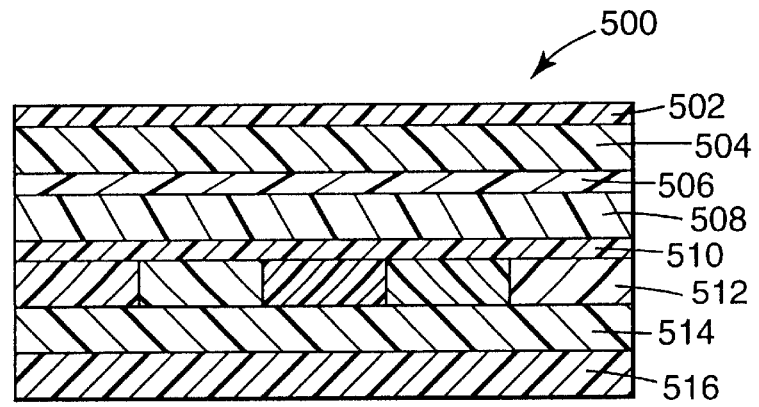
FIG. 5 is a schematic cross-sectional view of a color liquid crystal display according to one aspect of the invention.

FIG. 5 provides a cross-section view of a possible configuration of a color liquid crystal display device that incorporates one or more of the alignment structures of the invention. The color liquid crystal display device 500 includes a top polarizer 502 and a bottom polarizer 516. Between the top and bottom polarizers is a liquid crystal cell that includes a top alignment layer comprising a top substrate material 504 on which is disposed an ordered layer or coating of a lyotropic liquid crystal material 506. A bottom substrate is made of another ordered layer or coating of lyotropic liquid crystal material 510, a color filter array 512 and a bottom substrate material 514. Disposed between the two substrates and in contact with the two adjacent ordered layers or coatings of lyotropic material is liquid crystal material 508. Commonly, full color displays employ a regular pattern of primary color filters for color filter array 612. For example, the color filters can be a regular array of three colors, typically red, green and blue, or cyan, magenta and yellow. The color filters can be colored polarizers.

The following example is offered to aid in the understanding of the present invention and is not to be construed as limiting the scope thereof. Unless otherwise indicated, all parts and percentages are by weight.

EXAMPLES

Example 1

A chromonic material in zwitterionic form, 4-({4-[(4-carboxylphenyl)amino]-6-[4-(dimethylamino)pyridinium-1-yl]-1,3,5-triazin-2-yl}amino)benzoate, was prepared in the following manner according to the following reaction.

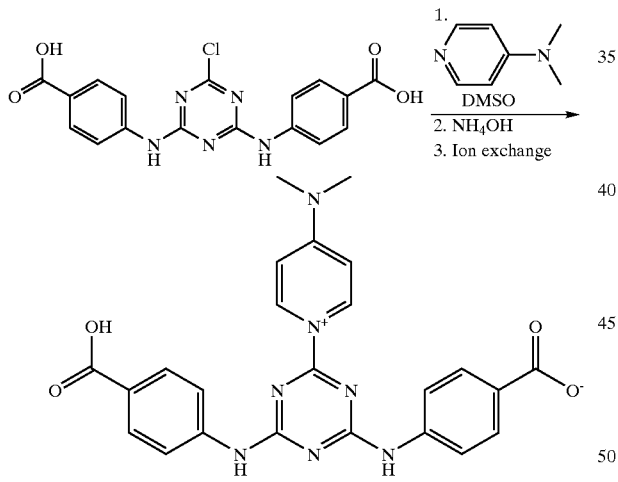

To a 500 mL three necked round bottom flask with a thermometer, overhead stirrer, and condenser was added 50 grams of 4,4-[(6-chloro-1,3,5-triazine,2,4-diyl)diimino]bis-benzoic acid, 15.83 grams of 4-dimethylaminopyridine, and 270 mLs of dimethylsulfoxide. The mixture was heated to 90° C. for a total of three hours. The mixture was cooled to room temperature and the resulting solid was collected by filtration, washed with dimethylsulfoxide and acetone and air dried to give 41.10 grams of 1-{4,6-bis[4-carboxyphenyl)amino]-1,3,5-triazin-2-yl}-4-(dimethylamino)pyridinium chloride. Fourteen grams of this solid was added to a one liter three necked round bottom flask with an overhead stirrer and to this was added 307 mLs of distilled water and 5.53 grams of 28 wt % aqueous ammonium hydroxide solution. The mixture was stirred until the solid dissolved. The solution was passed down a 600 mm by 58 mm column containing 300 g of Mitsubishi SAT-10 ion exchange resin (the resin was prewashed with a 0.5 wt % aqueous ammonium hydroxide solution). The eluent was stripped in vacuum at 15 mm Hg and 80° C. to give 12.66 g of 4-({4-[(4-carboxylphenyl)amino]-6-[4-(dimethylamino)pyridinium-1-yl]-1,3,5-triazin-2-yl}amino)benzoate.

Example 2

An aqueous solution of a chromonic compound (Compound A) was prepared having a concentration of between 8 and 10 percent by weight of solution. A thin layer of the chromonic solution was coated onto one side of each of two glass slides using a simple knife coater. The two glass slides were previously coated with a transparent conductive layer of indium tin oxide (700 Å). The slides were air dried, and glass beads 5 g in diameter were sprayed from solution on the side of each slide coated with the chromonic layer. The slides were adhered together in such a manner that the coating directions of the chromonic layers were at 90° to one another and such that the two cells together formed a simple cell construction. A small opening was left between the slides, and the cell was vacuum filled with nematic liquid crystal material ZLI1565, available from Merck Inc.

The filled cell was viewed under microscope between two crossed polarizers. The filled cell transmitted substantially all light between the polarizers, indicating the achievement of a uniformly-aligned 90° twist of the nematic liquid crystal material within the cell.

Various modifications and alterations of this invention will be apparent to those skilled in the art without departing from the scope and spirit of this invention, and it should be understood that this invention is not limited to the illustrative embodiments set forth herein.

What is claimed is:

1. A composition comprising a zwitterionic compound having the formula:

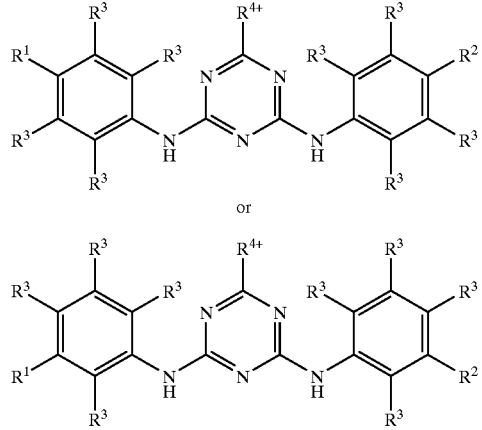

wherein:
  $R^1$ is a negatively charged hydrophilic group;
  $R^2$ is a hydrophilic group;
  each $R^3$, which may be the same or may be different, is an electron donating group, electron withdrawing group or an electron neutral group; and
  $R^4$ comprises a substituted or unsubstituted, positively charged heteroaromatic ring linked to the triazine backbone through a nitrogen atom in the $R^4$ ring.

2. The composition of claim 1 wherein:
R$^1$ is a hydrophilic group selected from the group consisting of carboxylate, sulfonate, sulfinate, and phosphate groups;
R$^2$ is a hydrophilic group selected from the group consisting of carboxylic acid, sulfonic acid, sulfinic acid, phosphoric acid, and sulfonamide; and
R$^4$ is selected from the group consisting of (a) unsubstituted, positively charged heteroaromatic rings linked to the triazine backbone through a nitrogen atom in the R$^4$ ring, and (b) substituted, positively charged heteroaromatic rings linked to the triazine backbone through a nitrogen atom in the R$^4$ ring, wherein the substituents for R$^4$ are selected from the group consisting of alkyl, carboxyl, amino, alkoxy, thio, cyano, amide and ester groups.

3. The composition of claim 1 wherein wherein R$^4$ is selected from the group consisting of rings derived from pyridine, pyridazine, pyrimidine, pyrazine, imidazole, oxazole, thiazole, oxadiazole, thiadiazole, pyrazole, triazole, triazine, quinoline, and isoquinoline.

4. The composition of claim 1 wherein R$^1$ is COO$^-$, R$^2$ is COOH and R$^3$ is H.

5. The composition of claim 1, wherein the heterocyclic ring R$^4$ is a pyridine ring.

6. The composition of claim 2 wherein the substituents for R$^4$ are amino or pyrrolidino groups.

7. The composition of claim 6 wherein the amino group is 4-dimethylamino or 4-pyrrolidino.

8. The composition of claim 1 further comprising at least one chiral compound, an alcohol and a surfactant.

9. A composition comprising a compound having the formula:

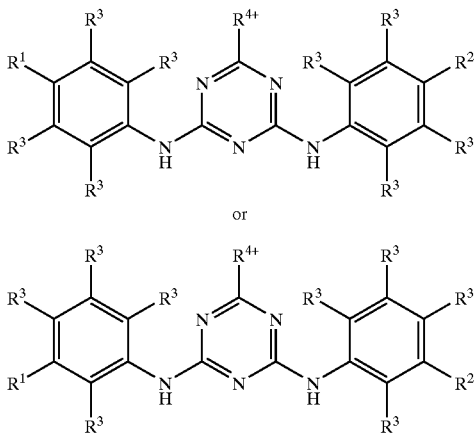

wherein:
R$^1$ is COO$^-$ or SO$_3^-$;
R$^2$ is COOH or SO$_3$H; each R$^3$, which may be the same or different, is H or CH$_3$; and
R$^4$ is a positively charged, substituted pyridine ring linked to the triazine backbone through a nitrogen atom in the pyridine ring, wherein the substituents for R$^4$ are selected from the group consisting of alkyl, carboxyl, amino, alkoxy, thio, cyano, amide and ester groups.

10. The composition or claim 9 wherein the substitutents for R$^4$ are selected form the group consisting of amino and pyrrolidino groups.

11. The composition of claim 10 wherein the amino group is a dimethylamino or 4-pyrrolidino group.

* * * * *